US012757300B2

(12) United States Patent
Ma et al.

(10) Patent No.: US 12,757,300 B2
(45) Date of Patent: Oct. 6, 2026

(54) DUAL COOPERATIVE INDUCTION TEMPERATURE CONTROL DEVICE AND CONTROL METHOD FOR MICRO-NANO IMPACT INDENTATION TESTER

(71) Applicant: JILIN UNIVERSITY, Changchun (CN)

(72) Inventors: Zhichao Ma, Changchun (CN); Shuai Tong, Changchun (CN); Guoxiang Shen, Changchun (CN); Wei Zhang, Changchun (CN); Hongcai Xie, Changchun (CN); Junming Xiong, Changchun (CN); Zixin Guo, Changchun (CN);

(Continued)

(73) Assignee: JILIN UNIVERSITY, Changchun (CN)

( * ) Notice: Subject to any disclaimer, the term of this patent is extended or adjusted under 35 U.S.C. 154(b) by 308 days.

(21) Appl. No.: 18/757,906

(22) Filed: Jun. 28, 2024

(65) Prior Publication Data

US 2025/0386402 A1 Dec. 18, 2025

(30) Foreign Application Priority Data

Jun. 18, 2024 (CN) ......................... 202410782839.9

(51) Int. Cl.
*H05B 6/14* (2006.01)
*F28D 20/02* (2006.01)
(Continued)

(52) U.S. Cl.
CPC ............... *H05B 6/14* (2013.01); *F28D 20/02* (2013.01); *G01N 3/02* (2013.01); *G01N 3/30* (2013.01); *H05B 6/06* (2013.01)

(58) Field of Classification Search
CPC ......... F28D 20/02; F28D 20/028; G01N 3/02; G01N 3/30; H05B 6/06; H05B 6/14
(Continued)

(56) References Cited

U.S. PATENT DOCUMENTS 8,087,282 B2 * 1/2012 Sawa ....................... G01N 3/42 73/1.89
11,415,498 B2 * 8/2022 Hu ........................... G01N 3/42
(Continued)

FOREIGN PATENT DOCUMENTS

CN 118111838 A 5/2024
JP 2004233274 A * 8/2004

OTHER PUBLICATIONS

Muller et al. "Experimental Studies of the Temperature Dependence of Mechanical Solder Material Properties Using Nanoindentation" 2009 11th Electronics Packaging Technology Conference (Year: 2009).*

*Primary Examiner* — John Fitzgerald
(74) *Attorney, Agent, or Firm* — Birchwood IP

(57) ABSTRACT

The present invention discloses a dual cooperative induction temperature control device and a control method for a micro-nano impact indentation tester. The device comprises a first cavity and a second cavity which are respectively arranged in a pressing rod and an stage, wherein a phase change heat storage material is arranged in the two cavities, and a phase change temperature of the phase change heat storage material is a target temperature of a specimen for testing; a first electromagnetic induction heater and a second electromagnetic induction heater which respectively perform non-contact heating on the pressing rod and the stage; and temperature detection mechanisms configured to detect the temperature of the specimen and the indenter. The temperature control device of the present invention combines electromagnetic induction heating and phase change (Continued)

heat storage, thus has the advantages of no interference to the testing of a precise instrument and good temperature stability.

8 Claims, 8 Drawing Sheets

(72) Inventors: Yicheng Li, Changchun (CN); Jiazheng Sun, Changchun (CN); Wenyang Zhao, Changchun (CN); Boyi Kou, Changchun (CN); Zaizheng Yang, Changchun (CN); Jiakai Li, Changchun (CN); Chaofan Li, Changchun (CN); Hongwei Zhao, Changchun (CN); Luquan Ren, Changchun (CN); Chuliang Yan, Changchun (CN)

(51) Int. Cl.
*G01N 3/02* (2006.01)
*G01N 3/30* (2006.01)
*H05B 6/06* (2006.01)

(58) Field of Classification Search
USPC .............................................................. 73/81
See application file for complete search history.

(56) References Cited

U.S. PATENT DOCUMENTS

| | | | | |
|---|---|---|---|---|
| 11,635,361 | B2 * | 4/2023 | Zhao | G01N 3/08<br>73/800 |
| 11,982,664 | B1 * | 5/2024 | Zheng | G01N 3/02 |
| 12,436,072 | B1 * | 10/2025 | Ma | G01N 3/04 |
| 2003/0070475 | A1 * | 4/2003 | Nagashima | G01N 3/42<br>73/81 |
| 2025/0314571 | A1 * | 10/2025 | Ma | G01N 3/068 |

* cited by examiner

DUAL COOPERATIVE INDUCTION TEMPERATURE CONTROL DEVICE AND CONTROL METHOD FOR MICRO-NANO IMPACT INDENTATION TESTER

CROSS-REFERENCE TO RELATED APPLICATIONS

This application claims priority to Chinese Patent Application No. 202410782839.9, filed on Jun. 18, 2024, which is hereby incorporated by reference in its entirety.

TECHNICAL FIELD

The present invention relates to the technical field of micro-nano impact indentation test equipment and the technical field of temperature control, and specifically to a dual cooperative induction temperature control device for a micro-nano impact indentation tester.

BACKGROUND

Micro-nano indentation test is a traditional method for testing the micromechanical properties of materials. A testing device of the micro-nano indentation test usually includes a stage for carrying a specimen, a pressing rod arranged along a normal direction of the specimen, a drive mechanism for driving the pressing rod to move along the normal direction of the specimen, and a detection unit. The specimen is fixed on the stage by a clamp, an indenter is provided at one end of the pressing rod facing the specimen, the drive mechanism drives the pressing rod to move, so that the indenter is indented into the specimen, and the detection unit is configured to detect the pressure and displacement during the indentation process. The mechanical property parameters such as fracture toughness, material hardness, and elastic modulus are obtained by recording load-displacement data in the indentation process. To ensure that the test is more accurate, the same specimen generally needs to be subjected to the multi-point testing, the final average value is taken as a testing result. Only a relative position between the indenter and the specimen needs to be changed in the multi-point testing process, for example, the specimen moves a certain distance along a direction vertical to a central line of the pressing rod, so that the operation is simple; meanwhile, the consistency of the test working condition needs to be maintained, that is, the test is performed under the same condition. However, this device can only indent the specimen in a quasi-static state at room temperature, and the strain rate of the specimen in the test process is low, so that the micromechanical properties of the materials under the coupling action of impact and high-temperature environment cannot be tested. In view of the above, technical personnel have made many improvements to the micro-nano indentation testing device to simulate impact and high-temperature environment. For example, the Chinese Patent Application Publication No. CN118111838A discloses an in-situ micro-nano impact indentation testing device, which uses a combination of a piezoelectric stack and a flexible hinge as a drive mechanism, and cooperates with a thin specimen to simulate an impact process with a high strain rate. This device adopts an electromagnetic induction heating technology to heat an indenter and a specimen, and connects the specimen and the indenter through a heat dissipation copper wire to balance the temperature difference therebetween. The electromagnetic induction heating technology adopted in the testing device has the function of non-contact heating and high energy utilization rate, but an alternating magnetic field is generated around the testing instrument, which can interfere with the testing results of high-precision instruments such as a load sensor and a displacement sensor, influence the testing precision (the error increases). However, the existing other heating modes have some defects, for example, laser heating is uneven, and the indenter and the specimen are placed in a high-temperature furnace during heating of the high-temperature furnace, so that it is inconvenient to observe the conditions of the indenter and the specimen, which brings troubles to the experimental operation.

SUMMARY

In view of the above problems, an objective of the present invention is to provide a dual cooperative induction temperature control device for a micro-nano impact indentation tester. This device improves the temperature control device in CN118111838A, controls the temperature by a heating method combining electromagnetic induction heating and phase change heat storage, takes the phase change temperature of a phase change heat storage material as a target control temperature, heats the phase change heat storage material by an electromagnetic inductor to perform phase change heat storage, wherein the electromagnetic inductor stops operating and no longer generates a magnetic field that interferes with the operation of precision instruments during the test, and maintains the temperature of an indenter and a specimen during testing to be constant by using the phase change heat release of the phase change heat storage material.

To achieve the above technical objective, the present invention adopts the following technical solutions.

A dual cooperative induction temperature control device for a micro-nano impact indentation tester comprises:

- a first cavity arranged in a pressing rod;
- a second cavity arranged in a stage, wherein a phase change heat storage material is placed in the first cavity and the second cavity, and a phase change temperature of the phase change heat storage material is a target temperature for testing a specimen fixed on the stage;
- a first electromagnetic induction heater configured to perform non-contact heating on the pressing rod;
- a second electromagnetic induction heater configured to perform non-contact heating on the stage;
- temperature detection mechanisms configured to detect a temperature of the specimen and an indenter, wherein the indenter is fixed at one end of the pressing rod facing the specimen;
- a data collector configured to collect and record data of the temperature detection mechanisms, the first electromagnetic induction heater and the second electromagnetic induction heater; and
- a data processor configured to analyze the data collected by the data collector and judge whether the phase change heat storage material stores heat through phase change in the heat absorption process and whether the phase change heat storage material is in the phase change stage in the heat release process.

In a specific embodiment of the present invention, the dual cooperative induction temperature control device further comprises a gas pipeline, which is configured to blow room-temperature or low-temperature gas to the pressing rod and the stage so as to accelerate a temperature reduction rate of the pressing rod and the stage when a temperature is above a phase change temperature.

In a specific embodiment of the present invention, the gas in the gas pipeline is an inert gas.

In a specific embodiment of the present invention, an outer wall of the pressing rod and an outer wall of the stage are provided with thermal insulation layers, the pressing rod is in direct contact with the indenter, and the stage is in direct contact with the specimen.

In a specific embodiment of the present invention, the dual cooperative induction temperature control device further comprises a controller, wherein the controller is electrically connected to the data processor, the first electromagnetic induction heater, the second electromagnetic induction heater and a drive mechanism, and is configured to obtain data of the data processor and control operation states of the first electromagnetic induction heater, the second electromagnetic induction heater and the drive mechanism.

In a specific embodiment of the present invention, the dual cooperative induction temperature control device further comprises a thermally conductive copper wire, one end of the thermally conductive copper wire is connected to the stage, and the other end of the thermally conductive copper wire is connected to the pressing rod, so that "a thermally conductive bridge" is formed between the stage and the pressing rod, the temperature difference between the stage and the pressing rod is reduced, and the test precision is improved; meanwhile, the energy is saved, and the experiment time is saved.

A dual cooperative induction temperature control method for a micro-nano impact indentation tester controls the temperature of the micro-nano impact indentation tester by adopting the dual cooperative induction temperature control device for the micro-nano impact indentation tester, and comprises the following steps:

S1: heating the pressing rod and the stage by using the first electromagnetic induction heater and the second electromagnetic induction heater to enable the phase change heat storage material to enter a heat absorption process;

S2: after the phase change heat storage material in the first cavity stores heat through phase change in the heat absorption process, stopping the first electromagnetic induction heater, so that the phase change heat storage material in the first cavity enters a heat release process; after the phase change heat storage material in the second cavity absorbs heat through phase change, stopping the second electromagnetic induction heater, so that the phase change heat storage material in the second cavity enters a heat release process; and S3: when the phase change heat storage material in the first cavity and the phase change heat storage material in the second cavity are in the heat release process and in a phase change stage, performing a micro-nano impact indentation test, when the phase change heat storage material in the first cavity or the phase change heat storage material in the second cavity is in the heat release process and completes the phase change, stopping performing the micro-nano impact indentation test and returning to the step S1, and repeating the steps S1-S3 until the specimen completes all the micro-nano impact indentation tests.

In a specific embodiment of the present invention, in the step S2, after the temperature change rates of the specimen and the indenter change from a positive value to zero and then to a positive value, the second electromagnetic induction heater and the first electromagnetic induction heater are stopped; in the heat release process of the step S3, when the temperature change rate of the specimen or the indenter is zero, the corresponding phase change heat storage material is in the phase change stage, and when the temperature change rate of the specimen or the indenter changes from zero to a negative value, the corresponding phase change heat storage material completes the phase change.

Compared with the prior art, the technical solutions of the present invention have the following technical effects.

The temperature control device of the present invention combines electromagnetic induction heating and phase change heat storage, heats a phase change heat storage material by utilizing the electromagnetic induction heating, so that the phase change heat storage material stores heat through phase change, and then provides heat for an indenter and a stage of a micro-nano impact indentation tester by phase change heat release in the testing process. Since the temperature does not change in the phase change process, the temperature control device can maintain the temperature of the indenter and the stage to be stabilized at the phase change temperature point in the testing process, the electromagnetic induction heating device stops operating when the indentation test is performed, the influence of a magnetic field generated by electromagnetic induction on a test instrument is overcome, meanwhile, the temperature of the indenter and the specimen can be always maintained at the phase change temperature in the testing process, the stability is good, and the temperature difference between the indenter and the specimen is extremely small.

DESCRIPTION OF EMBODIMENTS

Figure 1:
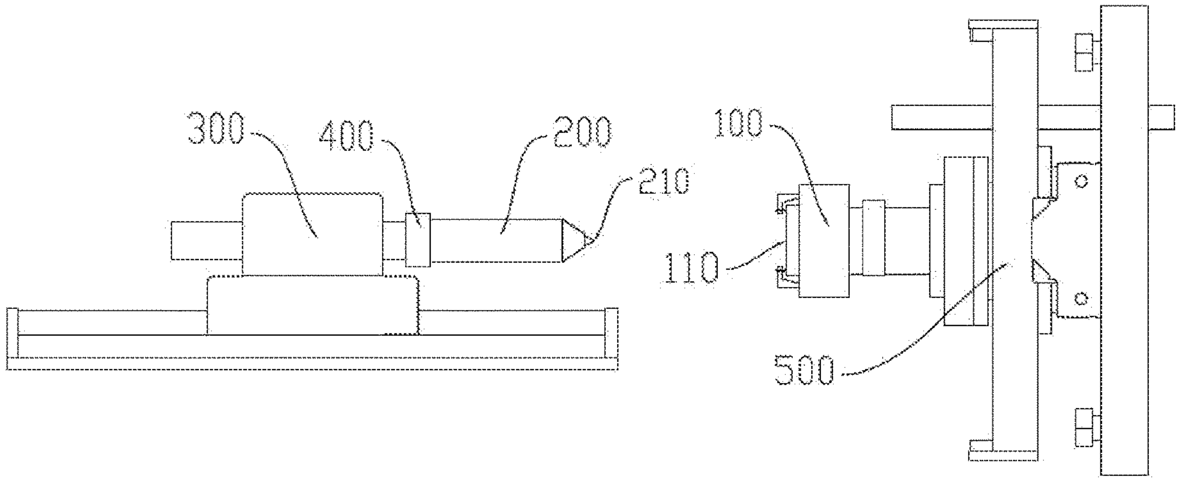
FIG. 1 (Prior Art)
FIG. 1 is a schematic diagram of a structure of a micro-nano impact indentation test device in the prior art.

For a better understanding of the present invention, before describing the present invention, it is necessary to briefly describe the structure of the existing micro-nano impact indentation testing device, which is shown in FIG. 1 and comprises a stage 100, a pressing rod 200, a drive mechanism 300 and a detection unit 400. The stage 100 is configured to carry a specimen 110, and the specimen 110 is fixed on the stage 100 through a clamp. The pressing rod 200 is arranged along a normal direction of the specimen 110, and an indenter 210 is fixed on one end of the pressing rod 200 facing the specimen 110. The drive mechanism 300 drives the pressing rod 200 to move along the normal direction of the specimen 110, so that the indenter 210 is indented into the specimen 110. The detection unit 400 comprises a pressure measuring instrument and a displacement measuring instrument configured to measure load-displacement data during the indenting of the indenter 210 into the specimen 110. The stage 100 is carried on an XYZ three-axis moving frame 500 for conveniently adjusting the relative position between the indenter 210 and the specimen 110, so as to perform indentation testing on different parts of the specimen 110. The drive mechanism 300 is a combination of a piezoelectric stack and a flexible hinge, which belongs to the prior art and is not described in detail herein. In addition, the specific structure of the existing micro-nano impact indentation testing device can also refer to the Chinese Patent Application Publication No. CN118111838A. An objective of the present invention is to improve a temperature control system of the existing micro-nano impact indentation testing device.

Embodiments of the present invention will be described in detail below, and examples of the embodiments are shown in the accompanying drawings, wherein the same or similar reference numerals indicate the same or similar elements or elements having the same or similar functions throughout. The embodiments described below with reference to the accompanying drawings are illustrative only for the purpose of explaining the present invention, and are not to be construed as limiting the present invention.

EMBODIMENT

FIGS. 2 to 9 are schematic structural diagrams of two specific embodiments of the dual cooperative induction temperature control method for the micro-nano impact indentation tester according to the present invention. The dual cooperative induction temperature control device for the micro-nano impact indentation tester according to the present invention comprises a first cavity 220 arranged in a pressing rod 200; a second cavity 120 arranged in a stage 100, a first electromagnetic induction heater 610 configured to perform non-contact heating on the pressing rod 100, a second electromagnetic induction heater 620 configured to perform non-contact heating on the stage 100, temperature detection mechanisms (421, 422, 423), a data collector 710, and a data processor 720. A specimen 110 is fixed on the stage 100, an indenter 210 is fixed at one end of the pressing rod 200 facing the specimen 110, the temperature detection mechanisms (421, 422) detect the temperature of the specimen 110 and the indenter 210, the data collector 710 is configured to collect and record data of the temperature detection mechanisms (421, 422, 423), the first electromagnetic induction heater 610 and the second electromagnetic induction heater 620, a phase change heat storage material 800 is placed in the first cavity 220 and the second cavity 120, a phase change temperature of the phase change heat storage material 800 is a target temperature for testing the specimen 110, and the data processor 720 is configured to analyze the data collected by the data collector 710 and judge whether the phase change heat storage material 800 stores heat through phase change in the heat absorption process and whether the phase change heat storage material is in the phase change stage in the heat release process.

The temperature control device of the present invention comprises the following steps when in use:

S1: heating the pressing rod 200 and the stage 100 by using the first electromagnetic induction heater 610 and the second electromagnetic induction heater 620 to enable the phase change heat storage material 800 to enter a heat absorption process;

S2: after the phase change heat storage material 800 in the first cavity 220 stores heat through phase change in the heat absorption process, stopping the first electromagnetic induction heater 610, so that the phase change heat storage material 800 in the first cavity 220 enters a heat release process; after the phase change heat storage material 800 in the second cavity 120 absorbs heat through phase change, stopping the second electromagnetic induction heater 620, so that the phase change heat storage material 800 in the second cavity 120 enters a heat release process; and S3: when the phase change heat storage material 800 in the first cavity 220 and the phase change heat storage material 800 in the second cavity 120 are in the heat release process and in a phase change stage, performing a micro-nano impact indentation test, when the phase change heat storage material 800 in the first cavity 220 or the phase change heat storage material 800 in the second cavity 120 is in the heat release process and completes the phase change, stopping performing the micro-nano impact indentation test and returning to the step S1, and repeating the steps S1-S3 until the specimen 110 completes all the micro-nano impact indentation tests.

According to the temperature control device for the micro-nano impact indentation tester of the present invention, both the first electromagnetic induction heater 610 and the second electromagnetic induction heater 620 adopt the non-contact heating. For example, the first electromagnetic induction heater 610 and the second electromagnetic induction heater 620 are sleeved on outer walls of the pressing rod 200 and the stage 100 and are spaced from the outer walls by a certain distance, so that the visual fields for observing the specimen 110 and the indenter 210 in the experiment process cannot be obstructed. Meanwhile, the temperature of the indenter 210 and the specimen 100 is controlled by combining an electromagnetic induction heating technology and phase change heat storage, when the impact indentation test is performed, the first electromagnetic induction heater 610 and the second electromagnetic induction heater 620 stop operating, and a magnetic field that interferes with the measurement of a precision instrument cannot be generated. In addition, the specimen 110 and the indenter 210 are heated by heat released in the phase change process of the phase change heat storage material 800 by utilizing the principle that the temperature of the phase change heat storage material 800 is unchanged in the phase change process, so that the temperature of the indenter 210 and the specimen 100 is stabilized, and the temperature difference between the indenter and the specimen is extremely small. Therefore, the present invention can accurately control the temperature of the indenter 210 and the specimen 100 to keep consistent while maintaining high precision of instrument measurement.

According to the temperature control device for the micro-nano impact indentation tester of the present invention, the phase change heat storage material 800 may be a metal element, an inorganic compound, or an organic compound, and the phase change may be a melting and solidification process of solid-liquid interconversion, or a vaporization and liquefaction process of liquid-gas interconversion. However, the phase change temperature of the vaporization and liquefaction process is greatly influenced by pressure, and the control difficulty is larger than that of the melting and solidification process. Therefore, in some embodiments, the phase change process of melting and solidification is preferentially selected, and the specific phase change heat storage material 800 may be selected based on a target temperature, such as aluminum tribromide (with a melting point of 97.5° C.), aluminum triiodide (with a melting point of 188.32° C.), metallic bismuth (with a melting point of 271.4° C.), zinc (with a melting point of 419.53° C.) and hexachloroethane (with a melting point of 187° C.). In addition, the phase change heat storage material 800 preferentially uses a material that does not decompose under the phase change temperature condition to avoid phase change temperature fluctuations. Certainly, the phase change temperature of the phase change heat storage material 800 is also lower than that of the pressing rod 200 and the stage 100, so that when the phase change heat storage material 800 is subjected to phase change, the first cavity 220 and the second cavity 120 maintain their original appearance. Meanwhile, the first cavity 220 and the second cavity 120 are provided with an inlet and an outlet, so that the phase change heat storage material 800 can be replaced, and the impact indentation processes at different target temperatures can be tested.

According to the temperature control device for the micro-nano impact indentation tester of the present invention, in the heat absorption process of the phase change heat storage material 800, the larger the phase change ratio of the phase change heat storage material 800 is, the more heat is stored, so that the more energy can be provided for the indenter 210 and the specimen 110 in the later stage, thereby ensuring that the indenter and the specimen are in a constant temperature state for a longer time. The heating frequency (the times of repeating the steps S1 to S3) is reduced; however, after all the phase change heat storage materials are subjected to phase change, the temperature of the indenter 210 and the specimen 110 can be increased along with the increase of the heat, so that the temperature is higher than the phase change temperature. Therefore, in an ideal state, when the impact indentation test is performed, the phase change thermal storage materials 800 in the first cavity 220 and the second cavity 120 are subjected to 100% phase change, and the temperature is the phase change temperature. In practical use, the temperature of the indenter 210 and the specimen 110 may be increased to a temperature above the phase change temperature, and then the temperature is lowered to the phase change temperature for testing; however, the heating stage is influenced by the magnetic field, and the temperature measurement is not necessarily accurate. Therefore, it is difficult to determine when to stop heating and when to start testing based on the measured temperature value. In some embodiments, it is determined to determine the heating and testing time based on the temperature change rate and the change condition of the temperature change rate, that is, in the heat absorption process of the step S2, when the temperature change rate of the specimen 110 changes from a positive value to zero and then to a positive value, the second electromagnetic induction heater 620 is stopped; when the temperature change rate of the indenter 210 changes from a positive value to zero and then to a positive value, the first electromagnetic induction heater 610 is stopped; and accordingly, in the heat release process of the step S3, the initial value of the temperature change rate of the specimen 110 is negative. In this case, the phase change heat storage material 800 in the second cavity 120 is at the phase change temperature, which releases the heat by temperature reduction; when the temperature change rate of the specimen 110 is zero, the phase change heat storage material 800 in the second cavity 120 is just above the phase change temperature, which releases the heat by temperature reduction; and after the phase change is completed, when the temperature change rate of the specimen 110 changes from zero to a negative value, the phase change heat storage material 800 in the second cavity 120 is at the phase change temperature, which releases the heat by temperature reduction again, and the temperature change rate of the indenter 210 is the same as that of the specimen, which is not described in detail. Therefore, in the heat release process of the step S3, when the temperature change rate of the specimen 110 or the indenter 210 is zero, the corresponding phase change thermal storage material 800 is in the phase change stage; when the temperature change rate of the specimen 110 and the indenter 210 is zero, the impact indentation test can be performed; when the temperature change rate of the specimen 110 or the indenter 210 changes from zero to a negative value, the corresponding phase change thermal storage material 800 completes the phase change; and when the temperature change rate of any one of the specimen 110 and the indenter 210 changes from zero to a negative value, it is necessary to return to the step S1 and repeat the steps S1 to S3.

In some embodiments, to rapidly reduce the temperature of the phase change heat storage material 800 higher than the phase change temperature to the phase change temperature, gas pipelines (910, 920) are further provided to purge room-temperature or low-temperature gas to the pressing rod 200 and the stage 100 to reduce the temperature of the pressing rod 200 and the stage 100. Certainly, during the use process, the temperature reduction rate of the pressing rod and the stage can be adjusted by adjusting the gas purge volume of the pressing rod and the stage, so that the time difference between the pressing rod and the stage entering the phase change phase in the heat release process is smaller. In some embodiments, the gas in the gas pipelines (910, 920) is an inert gas, such as nitrogen or argon. When in use, the specimen 110 is purged with gas during the entire test process so as to form an inert gas atmosphere around the specimen 110 to prevent oxidation thereof.

In some embodiments, an outer wall of the pressing rod 200 and an outer wall of the stage 100 are provided with thermal insulation layers 900 to reduce heat dissipation during the experiment, so that the temperature stabilization time lasts longer. The pressing rod 200 is in direct contact with the indenter 210, and the stage 100 is in direct contact with the specimen 110, so that heat can be better transferred to maintain the temperature of the indenter 210 and the specimen 110.

According to the temperature control device for the micro-nano impact indentation tester of the present invention, the pressing rod 200 and the stage 100 have higher temperature in the testing process, and to prevent the influence of high temperature on other equipment components, a multi-stage thermal insulation protection mechanism (1011, 1012, 1020, 1031, 1032) can be provided, and the multi-stage thermal insulation protection mechanism can be specifically arranged at one end of the pressing rod 200 away from the stage 100, and also can be arranged at one end of the stage 100 away from the pressing rod 200. In some embodiments, the multi-stage thermal insulation protection mechanism (1011, 1012, 1020, 1031, 1032) is a three-stage temperature reduction structure formed by connecting three temperature reduction units in series and is configured to perform stage-by-stage temperature reduction on objects (200, 100) to be subjected to temperature reduction. A first-stage temperature reduction structure (1011, 1012) is a heat dissipation structure and comprises a heat dissipation copper wire 1011 and a cold source 1012, one end of the heat dissipation copper wire 1011 is inserted into the objects (200, 100) to be subjected to temperature, and the other end is connected to the cold source 1012, so that the heat of the objects (200, 100) to be subjected to temperature reduction is transferred to the cold source 1012. In a specific implementation, the cold source 1012 may be a low-temperature chamber, a second-stage temperature reduction structure 1020 is a heat insulation structure, which is a heat insulation baffle embedded in the objects (200, 100) to be subjected to the temperature reduction, and the heat insulation baffle is hollow and annular. A third-stage temperature reduction structure (1031, 1032) is a liquid cooling structure, which comprises a heat exchange channel 1031 penetrating through the objects (200, 100) to be subjected to temperature reduction and a supporting device 1032 conveying a cooling medium into the heat exchange channel, and the conveyed cooling medium may be a room-temperature or low-temperature medium such as water, so that a "heat dissipation-heat insulation-refrigeration" three-stage temperature reduction structure is formed.

In some embodiments, the dual cooperative induction temperature control device further comprises a controller 730, the controller 730 is electrically connected to the data processor 720 and is configured to obtain data of the data processor 720, and the controller 730 is electrically connected to the first electromagnetic induction heater 610, the second electromagnetic induction heater 620 and the drive mechanism 300, and is configured to control the operation states of the first electromagnetic induction heater 610, the second electromagnetic induction heater 620 and the drive mechanism 300.

Figure 2:
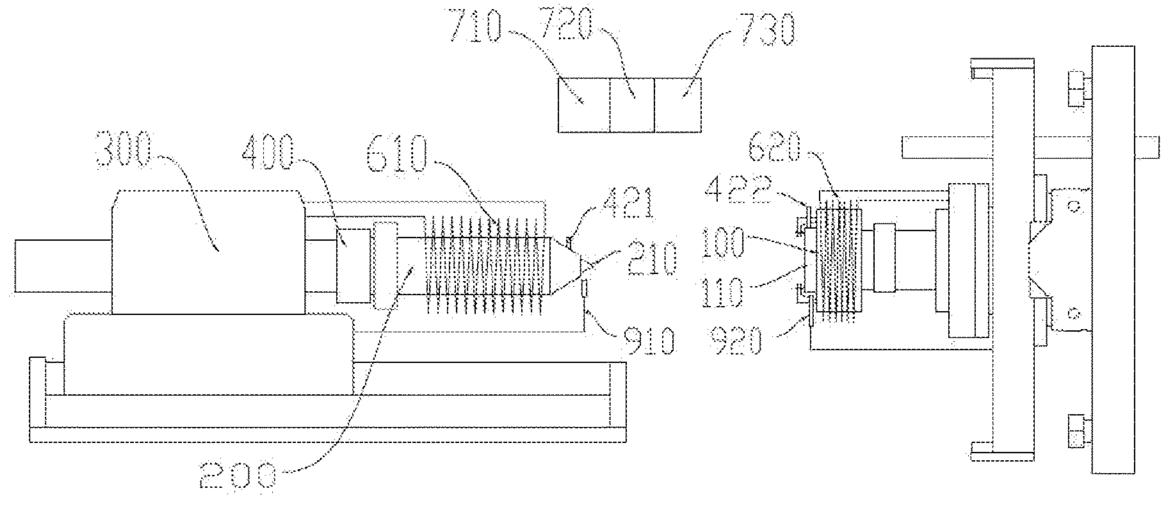
FIG. 2 is a schematic diagram of a structure of a dual cooperative induction temperature control method for a micro-nano impact indentation tester according to an embodiment.
Figure 3:
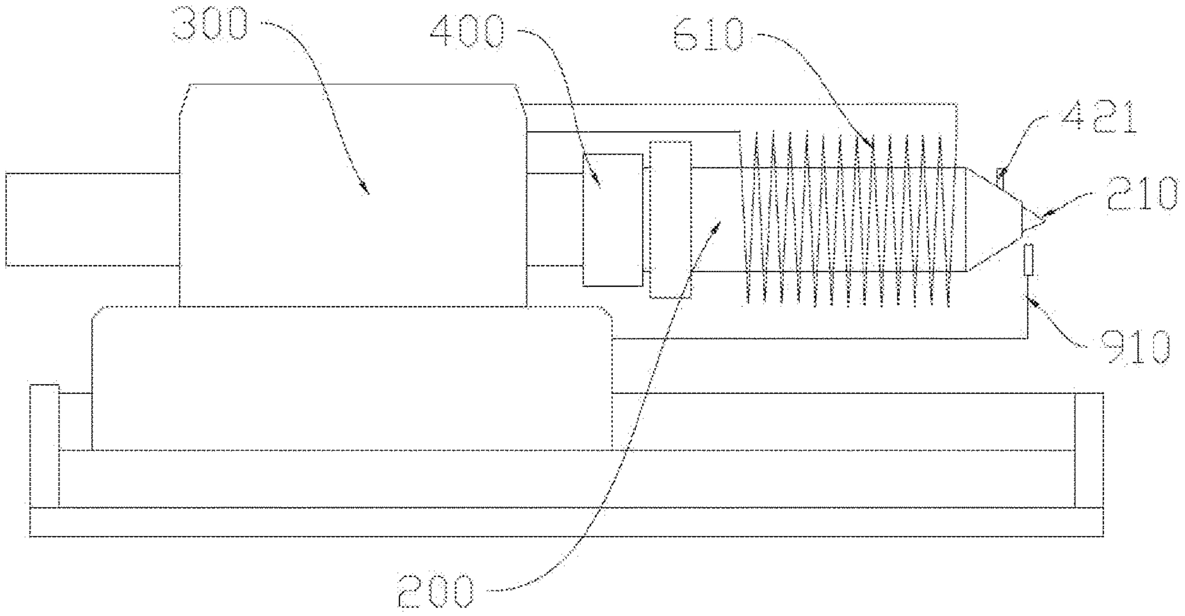
FIG. 3 is a schematic diagram of an overall structure of a pressing rod in FIG. 2.
Figure 4:
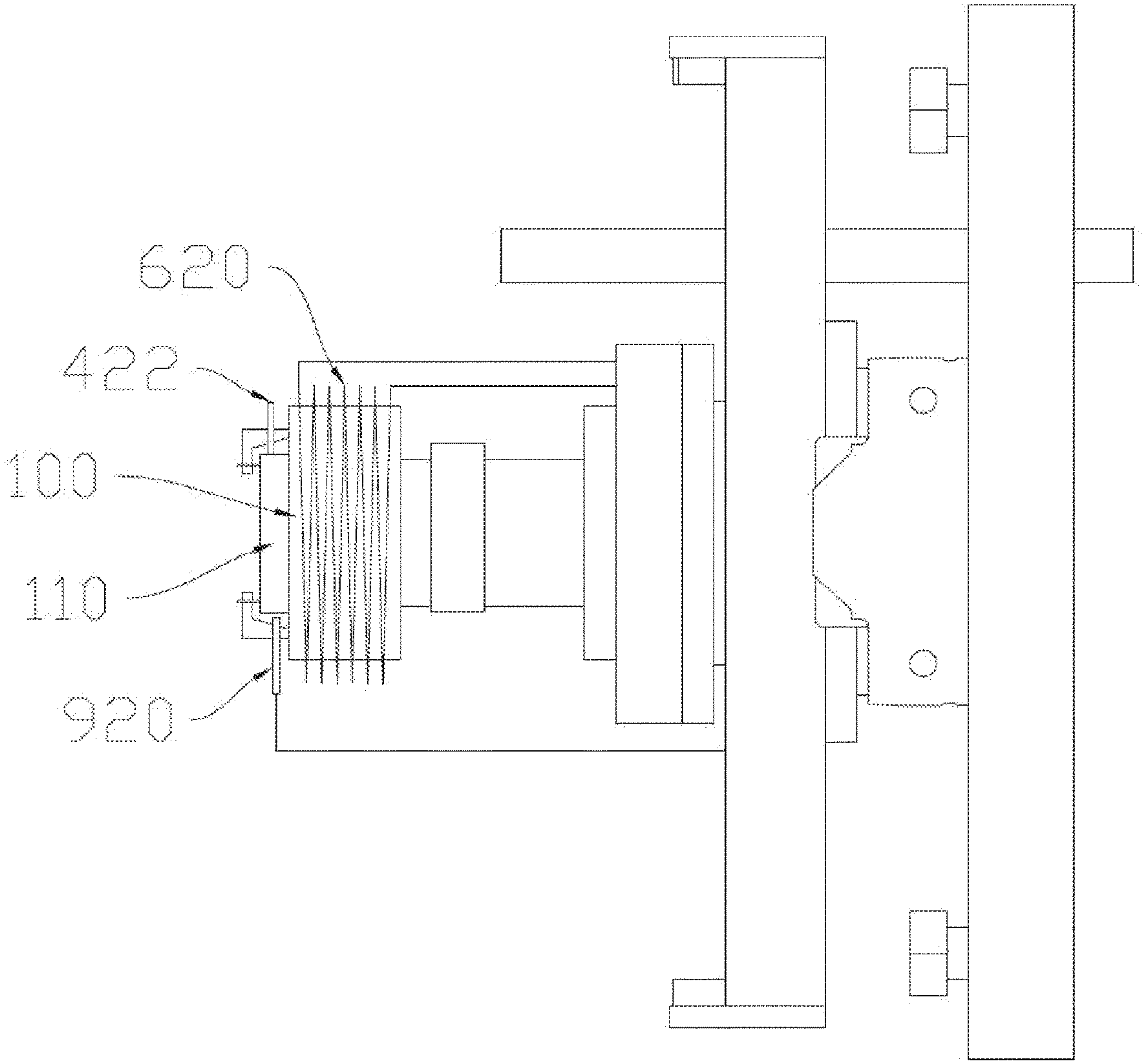
FIG. 4 is a schematic diagram of an overall structure of a stage in FIG. 2.
Figure 5:
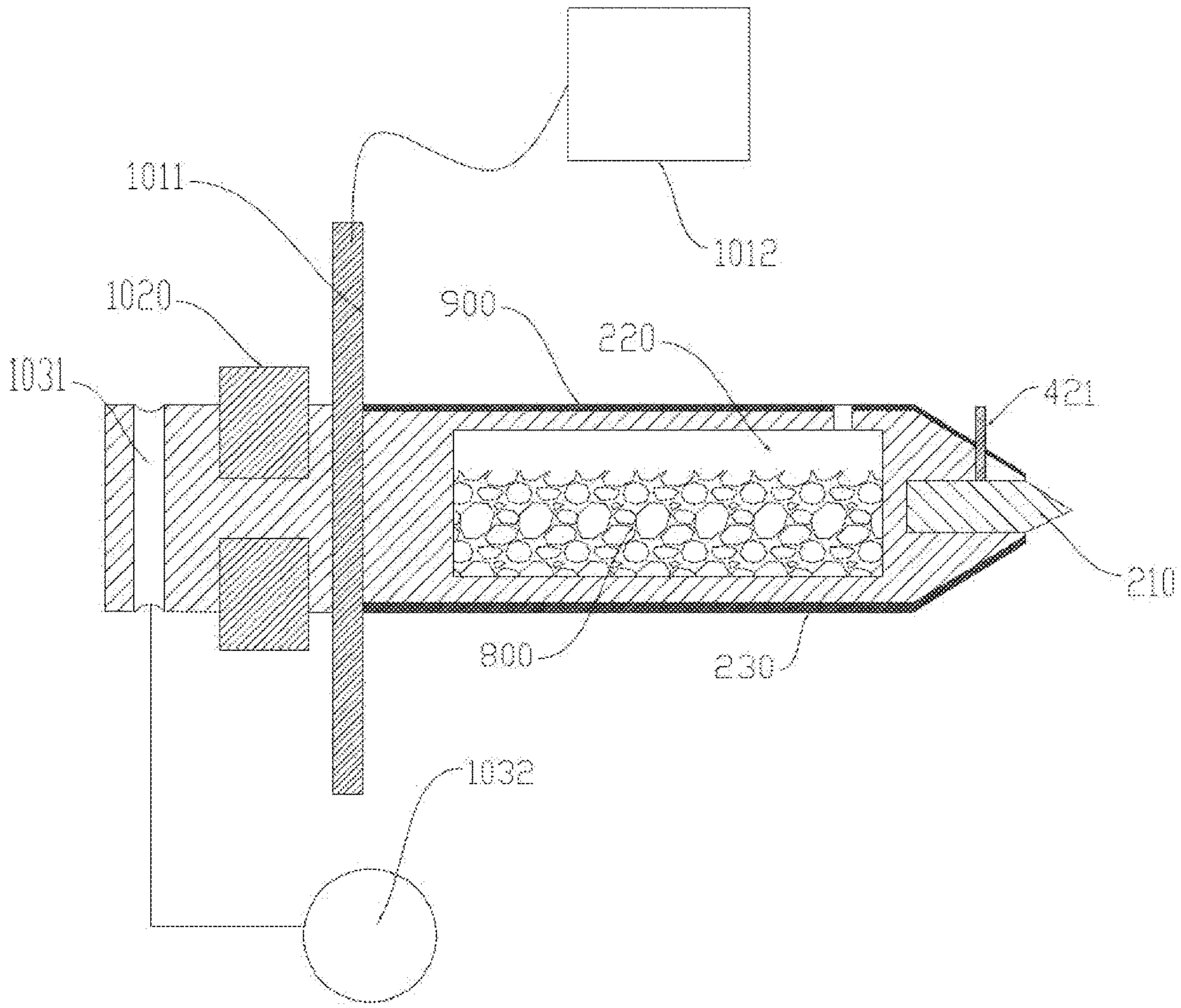
FIG. 5 is a cross-sectional view of the pressing rod in FIG. 3.
Figure 6:
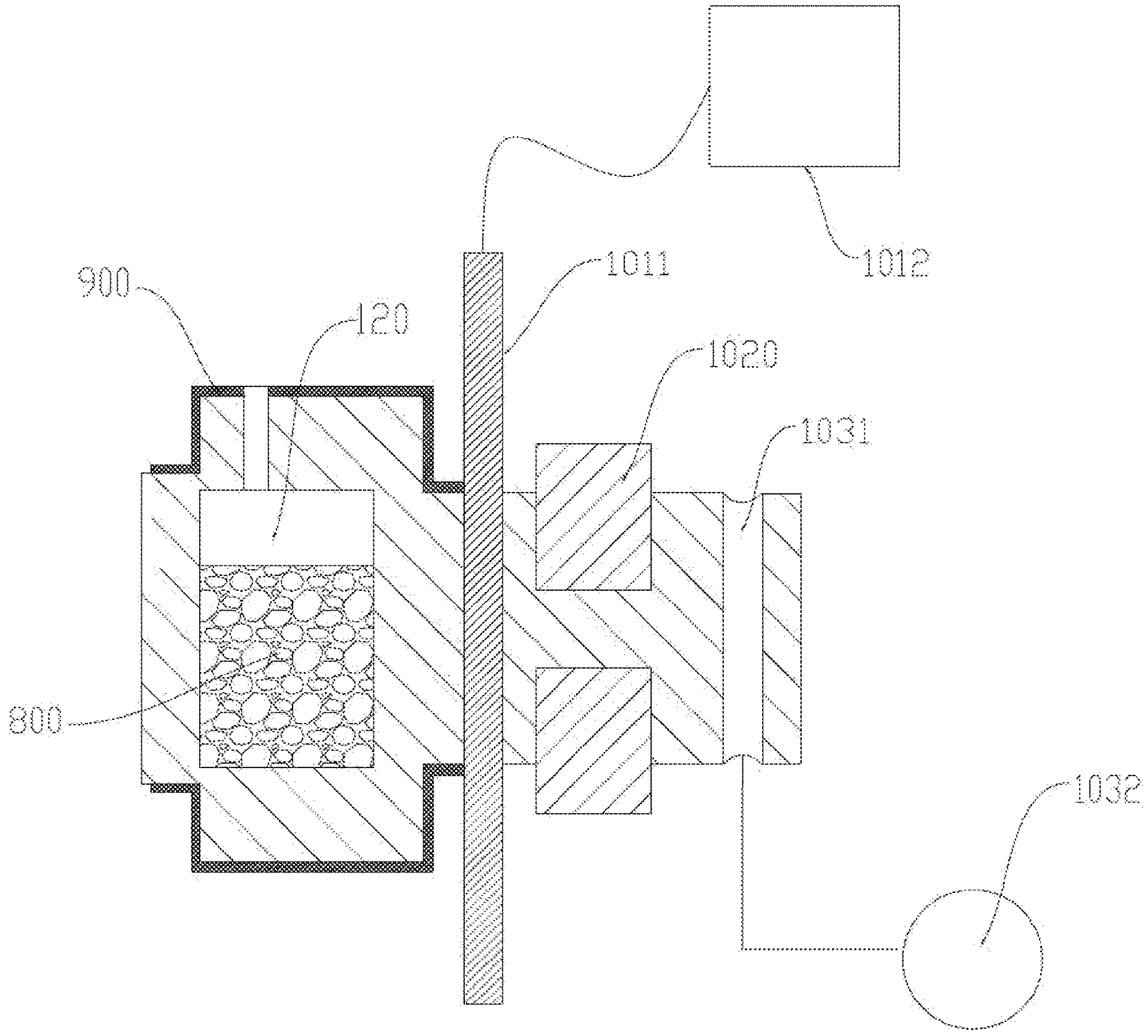
FIG. 6 is a cross-sectional view of the stage in FIG. 4.
Figure 7:
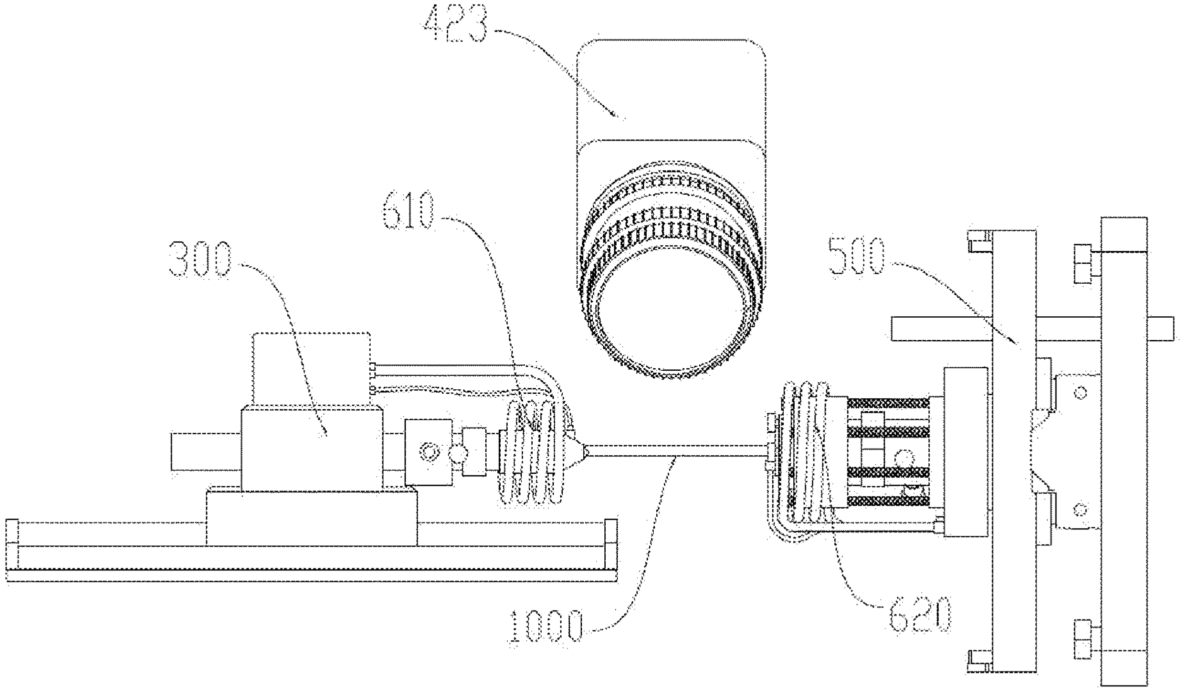
FIG. 7 is a schematic diagram of a structure of a dual cooperative induction temperature control method for a micro-nano impact indentation tester according to another embodiment.
Figure 8:
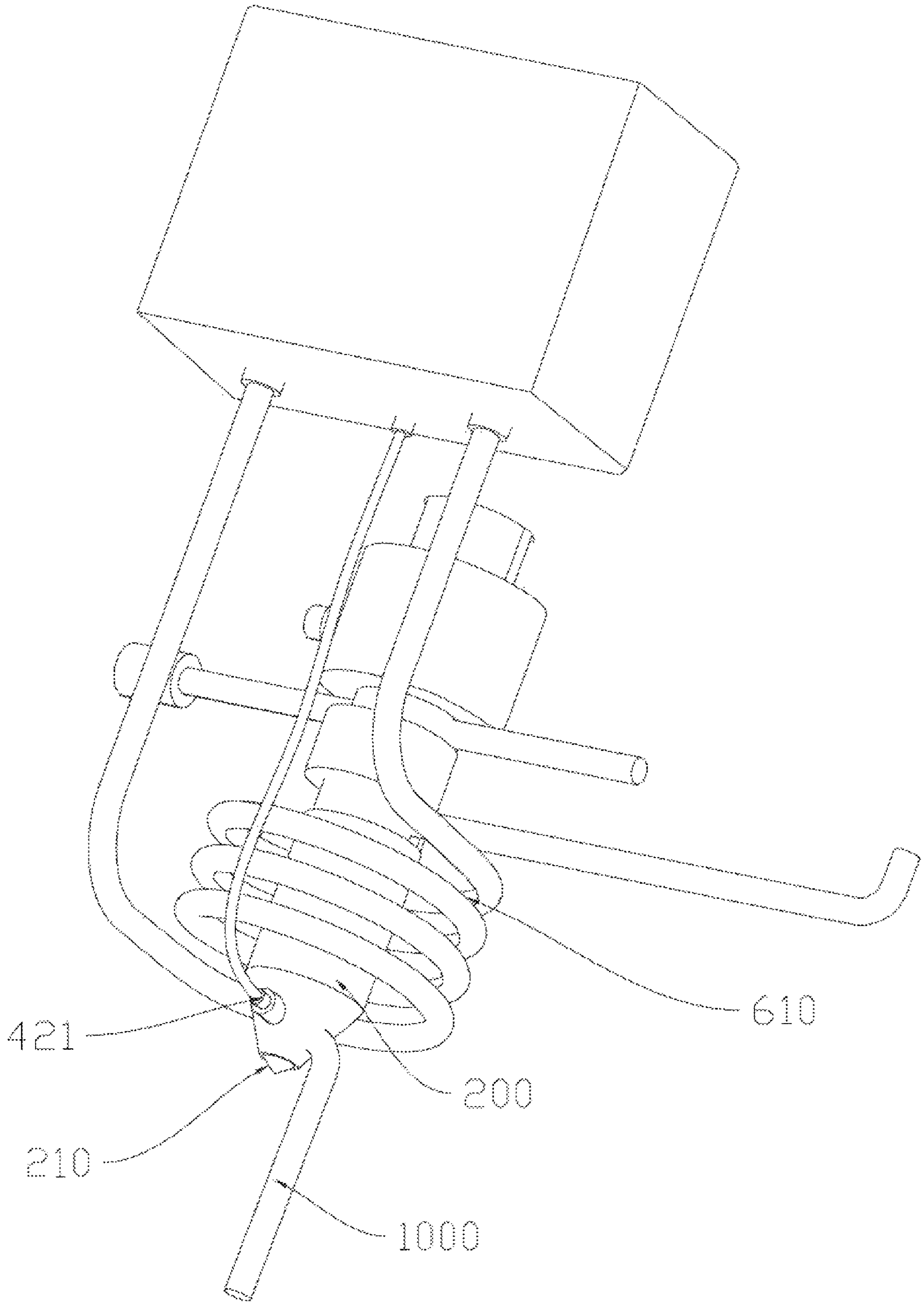
FIG. 8 is a schematic diagram of an overall structure of the pressing rod in FIG. 7.
Figure 9:
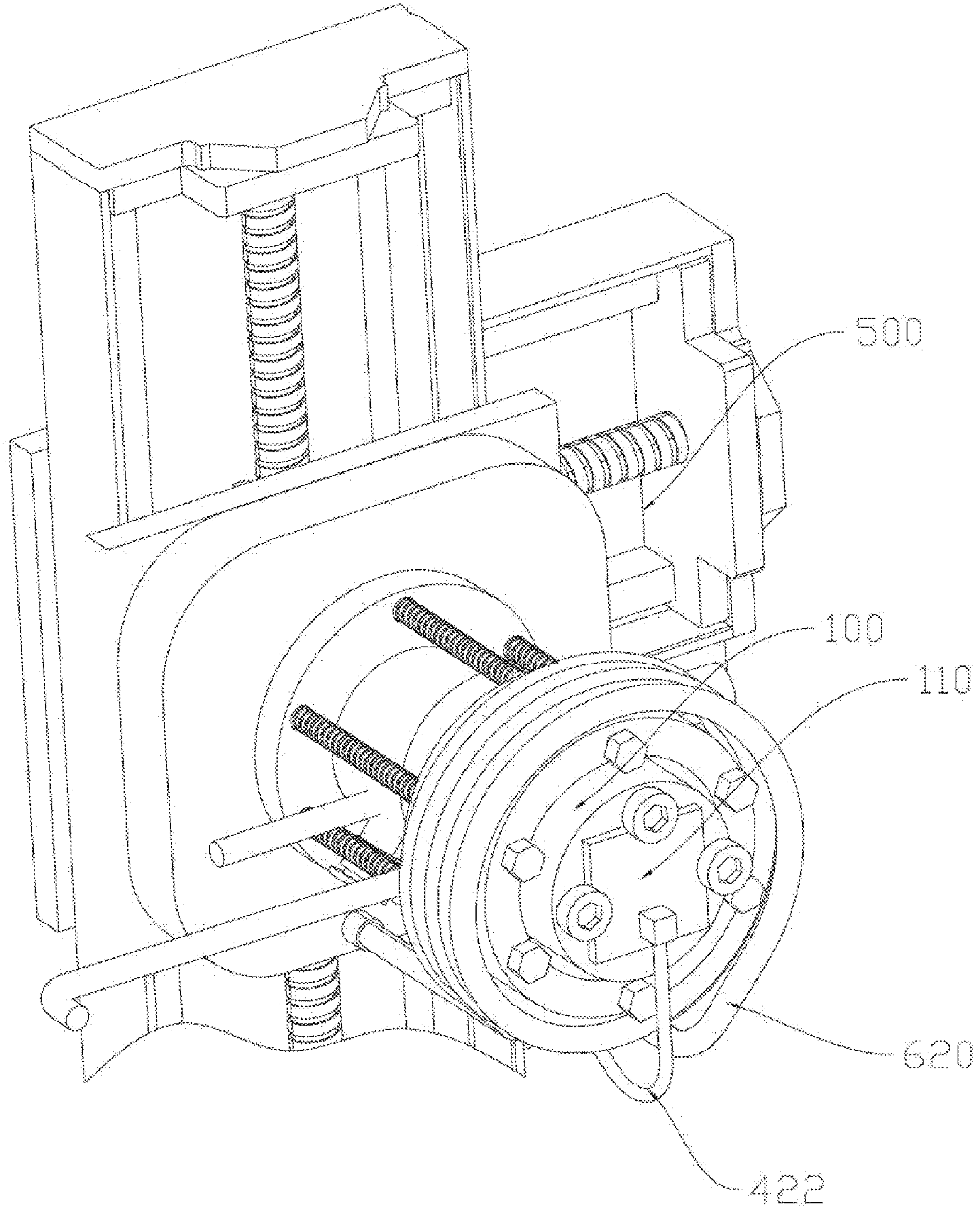
FIG. 9 is a schematic diagram of an overall structure of the stage in FIG. 7.

In some embodiments, the temperature detection mechanisms (421, 422, 423) are thermocouples, as shown in FIG. 2. In other embodiments, the temperature detection mechanisms (421, 422, 423) can also be thermal imagers. In some embodiments, as shown in FIGS. 7 to 9, the temperature detection mechanisms (421, 422, 423) comprise thermocouples (421, 422) and a thermal imager 423, and the thermal imager 423 is arranged above and below an entire high-temperature loading region, so as to obtain the global temperature distribution.

In some embodiments, the pressing rod 200 and the stage 100 are connected by a thermally conductive copper wire 1000, thereby forming "a thermally conductive bridge" between the pressing rod 200 and the stage 100. In this way, the temperature difference between the pressing rod and the stage can be automatically adjusted to achieve a high degree of consistency between the pressure rod 200 and the stage 100, thereby ensuring the accuracy of the test in a high-temperature environment of the micro-nano impact indentation tester. Meanwhile, in the phase change heat release process, when the phase change heat storage material 800 in one of the indenter 210 and the stage 110 completes the phase change, and the other does not complete the phase change, the temperature difference between the indenter and the stage can be balanced by the thermally conductive copper wire 1000, and the impact indentation test is continued until the phase change heat storage material 800 in the indenter 210 and the stage 110 completes phase change. This is equivalent to prolonging the time of a single experiment operation, which is beneficial to saving the experiment time, and is also equivalent to reducing the requirement for measuring the loading of the phase change heat storage material 800 in the indenter 210 and the stage 110. The material of the thermally conductive copper wire 1000 may be red copper with good thermal conductivity.

Although the embodiments of the present invention have been shown and described, it may be understood by those of ordinary skill in the art that various changes, modifications, substitutions, and alterations may be made to these embodiments without departing from the principle and purpose of the present invention, and the scope of the present invention is defined in the claims and equivalents thereof.

What is claimed is:

1. A dual cooperative induction temperature control device for a micro-nano impact indentation tester, comprises:

a first cavity arranged in a pressing rod;

a second cavity arranged in a stage, wherein a phase change heat storage material is placed in the first cavity and the second cavity, and a phase change temperature of the phase change heat storage material is a target temperature for testing a specimen fixed on the stage;

a first electromagnetic induction heater configured to perform non-contact heating on the pressing rod;

a second electromagnetic induction heater configured to perform non-contact heating on the stage;

temperature detection mechanisms configured to detect a temperature of the specimen and an indenter, wherein the indenter is fixed at one end of the pressing rod facing the specimen;

a data collector configured to collect and record data of the temperature detection mechanisms, the first electromagnetic induction heater and the second electromagnetic induction heater; and a data processor configured to analyze the data collected by the data collector and judge whether the phase change heat storage material stores heat through phase change in the heat absorption process and whether the phase change heat storage material is in the phase change stage in the heat release process.

2. The dual cooperative induction temperature control device for the micro-nano impact indentation tester according to claim 1, wherein an outer wall of the pressing rod and an outer wall of the stage are provided with thermal insulation layers, the pressing rod is in direct contact with the indenter, and the stage is in direct contact with the specimen.

3. The dual cooperative induction temperature control device for the micro-nano impact indentation tester according to claim 1, further comprising a thermally conductive copper wire, wherein one end of the thermally conductive copper wire is connected to the stage, and the other end of the thermally conductive copper wire is connected to the pressing rod.

4. The dual cooperative induction temperature control device for the micro-nano impact indentation tester according to claim 1, further comprising a gas pipeline configured to blow room-temperature or low-temperature gas to the pressing rod and the stage so as to accelerate a temperature reduction rate of the pressing rod and the stage when a temperature is above a phase change temperature.

5. The dual cooperative induction temperature control device for the micro-nano impact indentation tester according to claim 4, wherein the gas in the gas pipeline is an inert gas.

6. The dual cooperative induction temperature control device for the micro-nano impact indentation tester according to claim 5, further comprising a controller, wherein the controller is electrically connected to the data processor, the first electromagnetic induction heater, the second electromagnetic induction heater and a drive mechanism, and is configured to obtain data of the data processor and control operation states of the first electromagnetic induction heater, the second electromagnetic induction heater and the drive mechanism.

7. A dual cooperative induction temperature control method for a micro-nano impact indentation tester controlling the temperature of the micro-nano impact indentation tester by adopting the dual cooperative induction temperature control device for the micro-nano impact indentation tester according to claim 1, and comprising the following steps:

S1: heating the pressing rod and the stage by using the first electromagnetic induction heater and the second electromagnetic induction heater to enable the phase change heat storage material to enter a heat absorption process;

S2: after the phase change heat storage material in the first cavity stores heat through phase change in the heat absorption process, stopping the first electromagnetic induction heater, so that the phase change heat storage material in the first cavity enters a heat release process; after the phase change heat storage material in the second cavity absorbs heat through phase change, stopping the second electromagnetic induction heater, so that the phase change heat storage material in the second cavity enters a heat release process; and S3: when the phase change heat storage material in the first cavity and the phase change heat storage material in the second cavity are in the heat release process and in a phase change stage, performing a micro-nano impact indentation test, when the phase change heat storage material in the first cavity or the phase change heat storage material in the second cavity is in the heat release process and completes the phase change, stopping performing the micro-nano impact indentation test and returning to the step S1, and repeating the steps S1-S3 until the specimen completes all the micro-nano impact indentation tests.

8. The dual cooperative induction temperature control method for the micro-nano impact indentation tester according to claim 7, wherein in the step S2, after the temperature change rates of the specimen and the indenter change from a positive value to zero and then to a positive value, the second electromagnetic induction heater and the first electromagnetic induction heater are stopped; in the heat release process of the step S3, when the temperature change rate of the specimen or the indenter is zero, the corresponding phase change heat storage material is in the phase change stage, and when the temperature change rate of the specimen or the indenter changes from zero to a negative value, the corresponding phase change heat storage material completes the phase change.

* * * * *